US007017737B1

(12) United States Patent
Chen

(10) Patent No.: US 7,017,737 B1
(45) Date of Patent: Mar. 28, 2006

(54) STRUCTURE OF CD BOX

(76) Inventor: Sheng-Yuan Chen, 5Fl., No. 112, Minsheng E. Rd., Sec. 3, Taipei (TW)

( * ) Notice: Subject to any disclaimer, the term of this patent is extended or adjusted under 35 U.S.C. 154(b) by 0 days.

(21) Appl. No.: 10/937,268

(22) Filed: Sep. 10, 2004

(51) Int. Cl.
*B65D 85/30* (2006.01)

(52) U.S. Cl. ...................... 206/308.1; 206/311; 402/24

(58) Field of Classification Search ............. 206/308.1, 206/311, 472; 402/24, 73, 15, 16, 18, 70, 402/79, 21, 22; 281/15.1, 21.1, 29
See application file for complete search history.

(56) References Cited

U.S. PATENT DOCUMENTS

| | | | | |
|---|---|---|---|---|
| 790,762 | A * | 5/1905 | Templeton | 402/23 |
| 797,879 | A * | 8/1905 | White | 402/21 |
| 2,322,177 | A * | 6/1943 | Trussell | 402/21 |
| 2,542,165 | A * | 2/1951 | Taylor | 402/21 |
| 3,313,304 | A * | 4/1967 | Beyer | 402/22 |
| 4,294,558 | A * | 10/1981 | Errichiello | 402/75 |
| 4,429,901 | A * | 2/1984 | Clery et al. | 462/77 |
| 4,577,985 | A * | 3/1986 | Beyer | 402/22 |
| 4,624,228 | A * | 11/1986 | Sahara et al. | 123/378 |
| 5,209,593 | A * | 5/1993 | Ros | 402/77 |
| 5,695,054 | A * | 12/1997 | Weisburn et al. | 206/308.1 |
| 5,697,498 | A * | 12/1997 | Weisburn et al. | 206/308.1 |
| 6,554,132 | B1 * | 4/2003 | Lau | 206/303 |

* cited by examiner

*Primary Examiner*—Shian T. Luong
(74) *Attorney, Agent, or Firm*—Troxell Law Office, PLLC

(57) ABSTRACT

A CD box, wherein a connecting plate between two body parts forms a pair of engaging hooks, one end of each engaging hook is connected to the connecting plate to form a connecting end, and the other end forms an open tailing end, so that round holes on thin CD sleeves can be slipped over the engaging hook from the open tailing end. The open tailing ends extend down over the upper surface of the connecting plate, so that the thin CD sleeves with round holes are not subjected to sliding out of the open tailing ends.

3 Claims, 4 Drawing Sheets

STRUCTURE OF CD BOX

BACKGROUND OF THE INVENTION

1. Field of the Invention

The present invention is related to a CD box, and especially to a CD box able to mount therein multiple thin CD sleeves with engaging hooks.

2. Description of the Prior Art

CDs are media loading with data, and are extremely widely used, for instance, as CDs, VCDs and DVDs, or as CDs loaded with spare data or programs. The mode of storing of CDs often seen is to use non-woven fabric to make thin sleeves for receiving CDs, the thin sleeves are provided on their edges with round holes; multiple thin sleeves can be received in a CD box.

For example, the prior art U.S. Pat. No. 6,679376 titled "MD, CD and magnetic disk box structure" disclosed a box structure for receiving CDs. In this patent, a middle connecting plate is connected on two sides thereof with a first and a second box that are closable and openable, the middle connecting plate is further mounted thereon a sheet clip for clamping thin CD sleeves. Such a device can get a function of mounting multiple thin CD sleeves, however, by virtue that the sheet clip is additionally assembled on the boxes, it will largely increase the cost of production of the CD box and working hours for assembling, this is not be beneficial to sale. Particularly, operation of the sheet clip includes engaging of the round holes on a foldable plate with a snap member; the foldable plate can only be engaged after the thin CD sleeves are mounted on the snap member, this is an operation design quite wasting time; if the box structure is used by a proprietor of a VCD or DVD leasing store, this is a quite inconvenient design.

For objects to get rid of inconvenience of operation and to lower the cost of a CD box, FIG. 1 shows a kind of designing of a CD box. The entire structure of the CD box is formed by integrally injection shaping; a middle connecting plate 91 is provided thereon with engaging hooks 92. Referring to FIG. 2, the engaging hooks 92 each has a connecting end 921 integrally connecting with the middle connecting plate 91, and has an open tailing end 922. The middle connecting plate 91 is provided with slots 93 at the positions in corresponding to those of the engaging hooks 92. The open tailing ends 922 of the engaging hooks 92 are located at the positions above the slots 93 to form opened areas.

Therefore, each thin CD sleeve 20 is provided on a lateral edge with round holes 21 that can be slipped over the engaging hooks 92 from the open tailing ends 922 and can be hooked by the engaging hooks 92. By virtue that the open tailing ends 922 of the engaging hooks 92 are higher than the upper surface of the middle connecting plate 91, the top and the bottom surfaces of the engaging hooks 92 must be provided with protrusions 94 having the function of stopping to make the levels of the round holes 21 of the thin CD sleeves 20 higher, thus the round holes 21 can be kept in the engaging hooks 92 in order to prevent the thin CD sleeves 20 from sliding out of the engaging hooks 92, and an object of preventing sliding out is acquired. By providing the protrusions 94, a user must bend the thin CD sleeves 20 to make them slip over the engaging hooks 92 smoothly; this will render the action of slipping the thin CD sleeves 20 over the engaging hooks 92 less easy, and improvement is required.

SUMMARY OF THE INVENTION

The primary object of the present invention is to provide a CD box, wherein a connecting plate between two body parts forms a pair of engaging hooks, one end of each engaging hook is connected to the connecting plate to form a connecting end, and the other end forms an open tailing end, so that round holes on thin CD sleeves can be slipped over the engaging hook from the open tailing end. The open tailing ends extend down over the upper surface of the connecting plate, so that the thin CD sleeves with round holes are not subjected to sliding out of the open tailing ends.

Another object of the present invention is to provide a CD box, wherein an outer lateral side of the open tailing end of each engaging hook is formed to have a bevel surface, the uppermost position of the bevel surface is at about the upper surface of the connecting plate, and is most preferably higher than the upper surface, in order that the round holes on the thin CD sleeves can be slipped over the engaging hooks directly.

A further object of the present invention is to provide a CD box, wherein the lowermost position of each engaging hook is at about ½ height of the connecting plate, so that the thin CD sleeves can be moved out conveniently.

The present invention will be apparent in the structural features and the function of operation thereof after reading the detailed description of the preferred embodiment in reference to the accompanying drawings.

DETAILED DESCRIPTION OF THE PREFERRED EMBODIMENT

Figure 1:
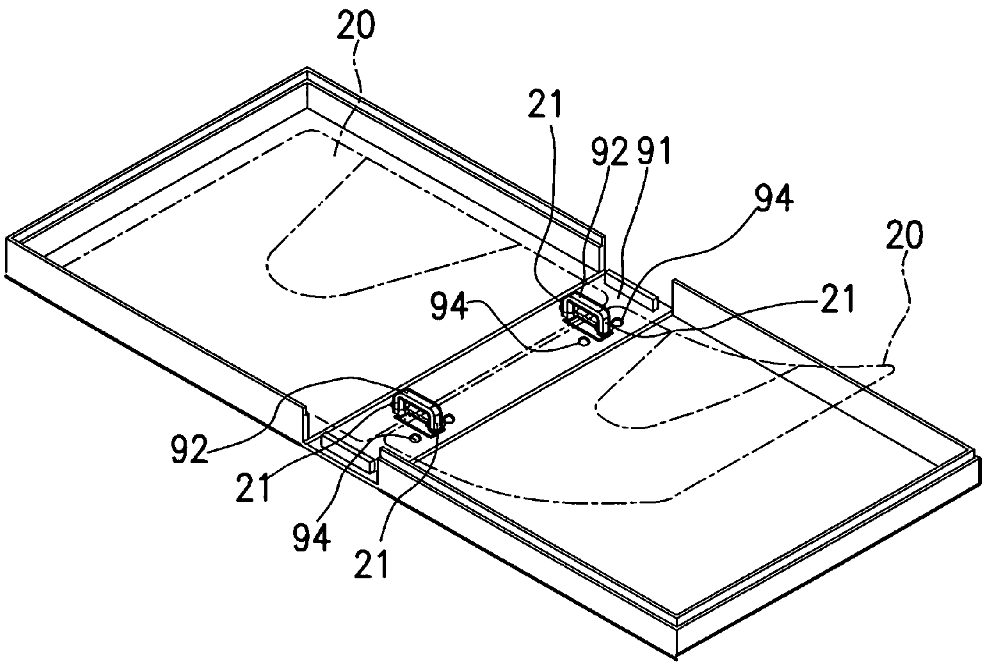
FIG. 1 shows a perspective view of a conventional CD box.
Figure 2:
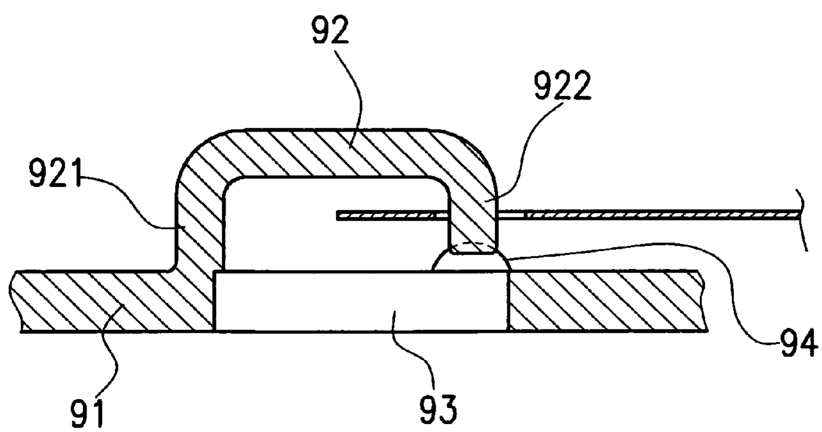
FIG. 2 is a sectional side view showing an engaging hook of the conventional CD box.
Figure 3:
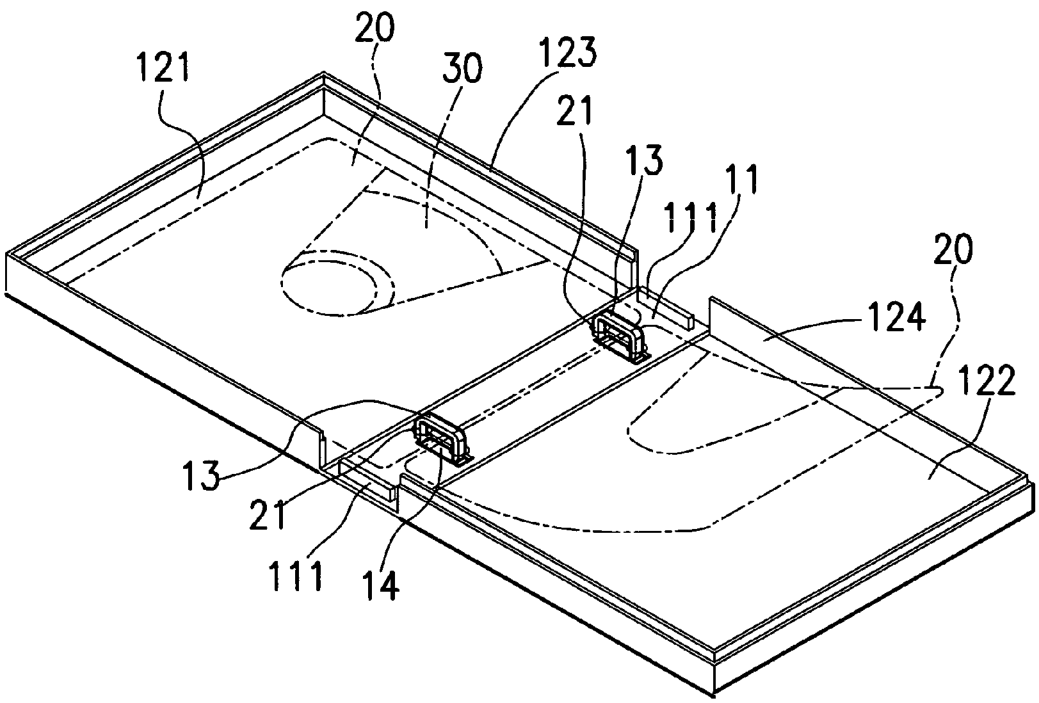
FIG. 3 is a perspective view of a CD box of the present invention, wherein a first and a second body part are oppositely opened up.
Figure 4:
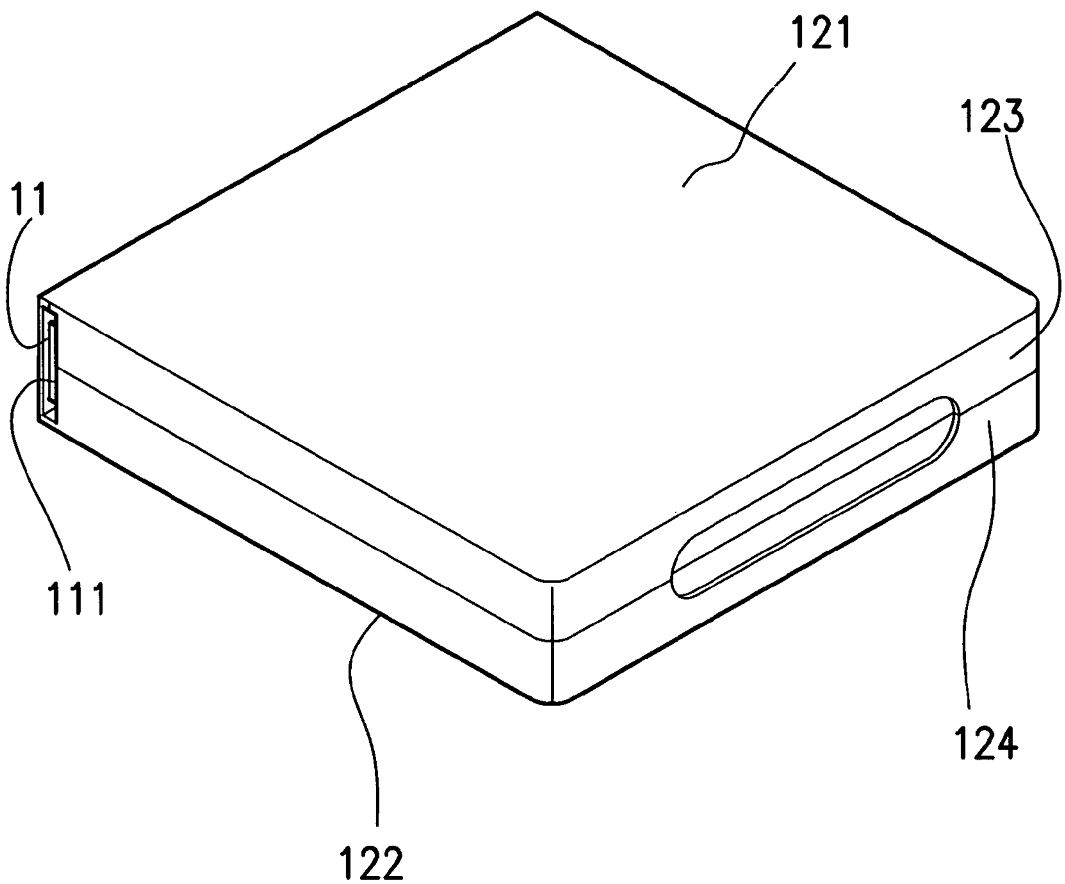
FIG. 4 is a perspective view of the CD box of the present invention, wherein the first and the second body parts are closed together.

Referring to FIGS. 3 and 4, the structure of the CD box of the present invention has therein an elongate connecting plate 11 which is provided with two blocks 111 on its two ends and has on its two lateral sides a first body part 121 and a second body part 122 respectively. By virtue that the first body part 121 is only connected with the connecting plate 11 on one side and the other three sides of it form stepped walls 123; and by virtue that the second body part 122 is only connected with the connecting plate 11 on one side and the other three sides of it form stepped walls 124, when the first and the second body parts 121, 122 are closed together, such as is shown in FIG. 4, a closed box is formed, a thin CD sleeve 20 having a CD 30 therein thus is protected.

The connecting plate 11 is formed to have in the middle thereof a pair of engaging hooks 13 extending upwardly for slipping thereover of and for fixing round holes 21 on an edge of the thin CD sleeve 20. The connecting plate 11 is formed to have elongate slots 14 at the positions in corresponding to those of the engaging hooks 13.

Figure 5:
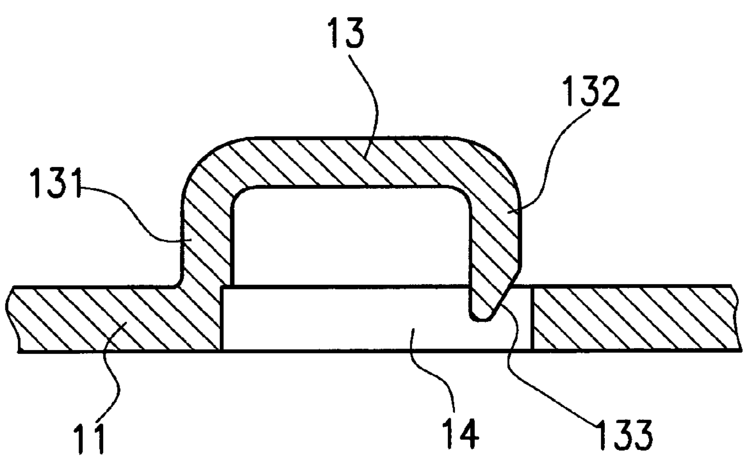
FIG. 5 is a sectional side view showing an engaging hook of the present invention.
Figure 6:
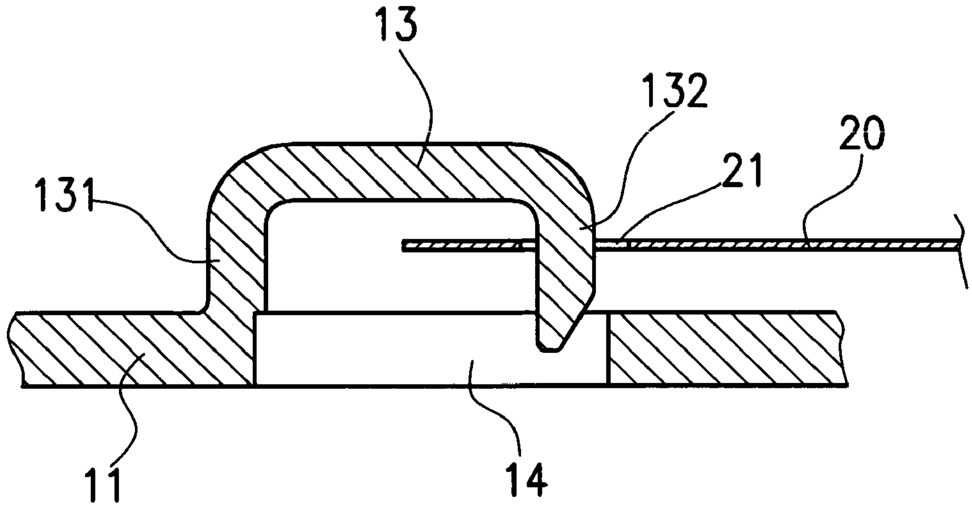
FIG. 6 is similar to FIG. 5, but a thin CD sleeve is mounted therein.

Referring to FIG. 5 showing a sectional side view of an engaging hook 13, one end of the engaging hook 13 has a connecting end 131 extending upwardly out of the connecting plate 11; the other end of the engaging hook 13 is an open tailing end 132; wherein the open tailing end 132 extends down over the upper surface of the connecting plate 11 into an elongate slot 14. By the fact that the open tailing end 132 extends over the upper surface of the connecting plate 11, so that a round hole 21 on the thin CD sleeve 20 can not slip off the open tailing end 132, this is shown in FIG. 6.

Figure 7:
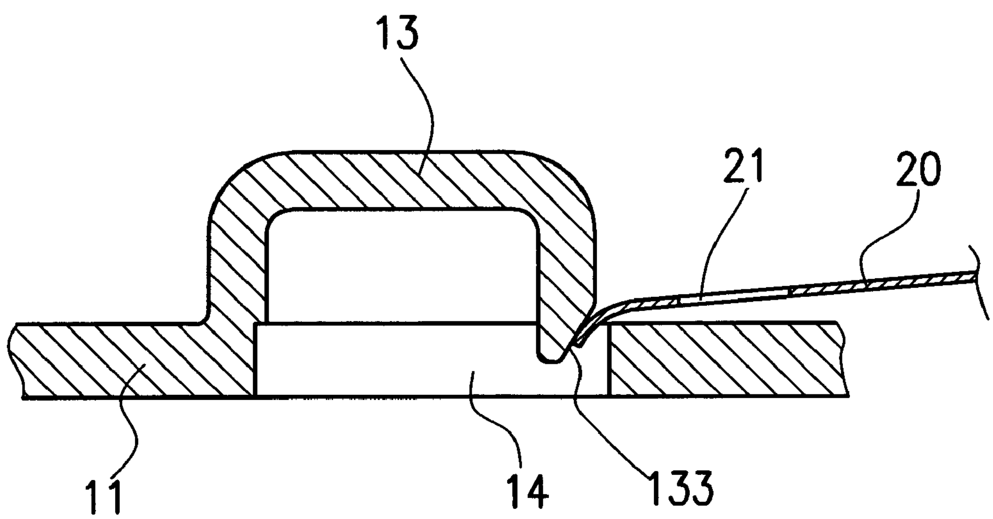
FIG. 7 is similar to FIG. 5, but a thin CD sleeve is slipped in against a bevel surface.

In order that the round hole 21 of the thin CD sleeve 20 can be slipped over the engaging hook 13 more easily, an outer lateral side of the open tailing end 132 of the engaging hook 13 is formed to have a bottom bevel surface 133, referring to FIG. 5, the uppermost position of the bevel surface 133 is at about the upper surface of the connecting plate 11, and is most preferably higher than the upper surface, as shown in FIG. 7, in order that the round hole 21 on the thin CD sleeve 20 can be slipped over the engaging hook 13 directly.

Certainly, in order to render the thin CD sleeve 20 able to slip off the engaging hook 13, the lowermost position of the engaging hook 13 is at about ½ height of the connecting plate 11, so that the thin CD sleeves can be moved out conveniently.

The embodiment stated above discloses that the present invention is used to mount the thin CD sleeve 20, the CD box of the present invention is of the specification of 152 mm×139 mm×25 mm, such thickness can afford loading 12 pieces of CDs; the CD box of the present invention can also be of the specification of 152 mm×256 mm×25 mm.

In conclusion, by having the designing of the open tailing end of the engaging hook, so that the thin CD sleeve of the present invention can be very easily mounted in the CD box, and the thin CD sleeve can be firmly restrained on the engaging hook after mounting without slipping off, this is evidently improved upon the conventional structure.

My invention is to be construed as including all modifications and variations falling within the scope of the appended claims.

What is claimed is:

1. A CD box for removably connecting a plurality of thin CD sleeves receiving CDs, the CD box comprising:

a) a connecting plate being an elongated body and having two elongated slots;

b) first and second body parts being movable between open and closed positions, each of the first and second body parts having one wall connected to one of two opposing lateral wall of the connecting plate and three walls, each of the three walls having a stepped wall; and c) two U-shaped engaging hooks located on the connecting plate, each of the two U-shaped engaging hooks aligning with one of the two elongated slots and having:

i) a connecting end fixedly connected to the connecting plate; and ii) an open tailing end protruding into one of the two elongated slots and being spaced apart from the connecting plate, wherein each of the two U-shaped engaging hooks is selectively inserted into one of a plurality of rounds holes of each of the plurality of thin CD sleeves by positioning each of the plurality of thin CD sleeves between the open tailing end and the connecting plate, the connecting plate and the two U-shaped engaging hooks are integrally formed, wherein the open tailing end of each of the two U-shaped engaging hooks having a bottom beveled surface, an upper most end of each bottom beveled surface is located adjacent to a top of one of the two elongated slots, wherein an upper most end of the bottom beveled surface is located above an upper surface of the connecting plate.

2. The CD box according to claim 1, wherein the open tailing end of each of the two U-shaped engaging hooks protrudes into one of the two elongated slots a distance of ½ a thickness of the connecting plate.

3. The CD box according to claim 1, wherein the connecting plate has two blocks, one of the two blocks is located on each of two opposing ends of the connecting plate.

* * * * *